R. I. HILL.
RUBBER HEEL.
APPLICATION FILED JAN. 31, 1918.
1,331,199. Patented Feb. 17, 1920.
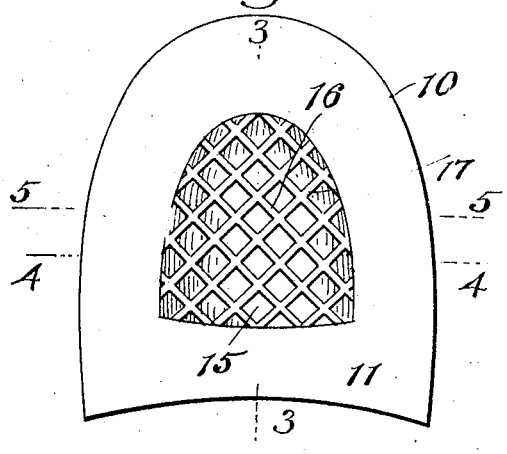
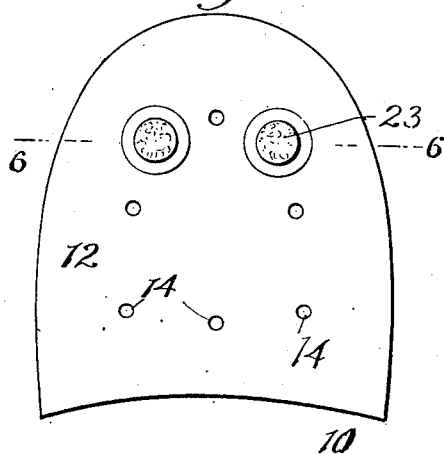
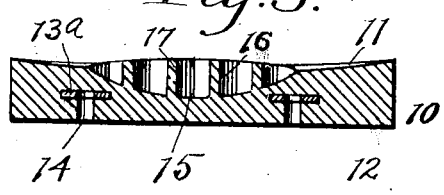
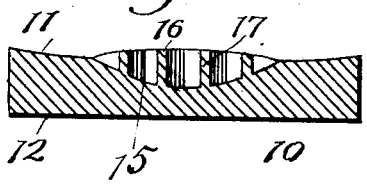
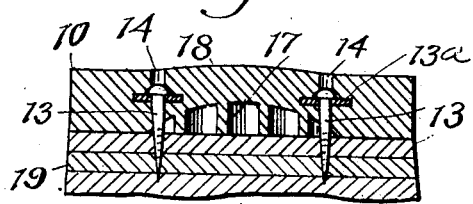
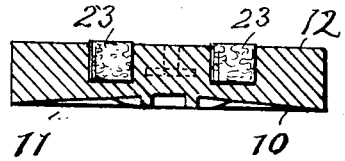
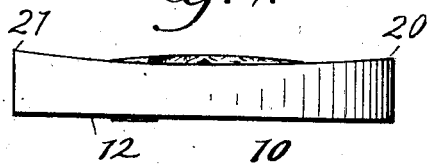
Inventor
Raymond I. Hill
By Thurston & Rivers
attys

UNITED STATES PATENT OFFICE.

RAYMOND I. HILL, OF ELYRIA, OHIO, ASSIGNOR TO THE HILL RUBBER HEEL COMPANY, OF ELYRIA, OHIO, A CORPORATION OF OHIO.

RUBBER HEEL.

1,331,199.  Specification of Letters Patent.  Patented Feb. 17, 1920.

Application filed January 31, 1918. Serial No. 214,606.

*To all whom it may concern:*

Be it known that I, RAYMOND I. HILL, a citizen of the United States, residing at Elyria, in the county of Lorain and State of Ohio, have invented a certain new and useful Improvement in Rubber Heels, of which the following is a full, clear, and exact description.

This invention relates to rubber heels, that is to say, heels formed of rubber or rubber composition, designed to be attached to the heels of shoes, and this application covers certain improvements over the construction constituting the subject matter of my prior application, Serial No. 193,233, filed September 26, 1917, and is a continuation and substantial division of my prior application, Serial No. 203,987, filed November 26, 1917.

The principal objects of this invention are to increase the resiliency of the rubber heel, and to so construct the latter that when applied to the heel of the shoe it will cling to the latter around the marginal edge thereof so as to prevent the entrance of dirt and other foreign particles and eliminate the necessity of cement to form a tight joint.

These and other objects are attained by the present invention which may be briefly summarized as consisting in certain novel details of construction which will be described in the specification and set forth in the appended claims.

In the accompanying sheet of drawings, Figure 1 is a plan view of a rubber heel embodying my invention, showing the attaching face; Fig. 2 is a similar view showing the tread face; Fig. 3 is a longitudinal sectional view substantially on the line 3—3 of Fig. 1; Fig. 4 is a transverse sectional view substantially along the line 4—4 of Fig. 1; Fig. 5 is a transverse sectional view through the rubber heel showing the same attached to the heel of a shoe, the section being taken substantially along the line 5—5 of Fig. 1; Fig. 6 is a sectional view substantially along the line 6—6 of Fig. 2; Fig. 7 is an edge view of the rubber heel looking toward the side of the same; and Fig. 8 is an edge view looking toward the breast of the heel.

The rubber heel embodying my invention consists of a body 10 of rubber, or rubber composition, of customary shape, and provided with an attaching face 11 and a tread face 12. The rubber heel is adapted to be secured to the heel of a shoe by a plurality of attaching devices 13, nails or screws, usually nails, the heel being provided with openings 14 to accommodate the attaching devices; and at the base of these openings there are preferably provided washers 13$^a$ for the heads of the attching devices.

Preferably the tread face 12 is normally flat (the word "normally" applies to the rubber heel before being attached to the heel of the shoe) and preferably the attaching face 11 is concave, the concavity extending inwardly from all marginal edges. Additionally on the attaching face there is a concavity 15, that is to say, a depression whose base dips or has a more pronounced and steeper concave curvature than the surrounding portion of the attaching face. Extending upwardly from the base of this concavity 15 are yieldable cushion members consisting preferably of webbing formed by intersecting ribs 16 which may, and preferably do, extend diagonally at right angles to each other, forming rectangular cells. Preferably the outer edges of these webs form a convex surface which curves down in all directions from the central point to the marginal or surrounding concave portion of the attaching face of the body 10.

This construction therefore provides on the concave attaching face a convex protuberance consisting of yieldable members in the form of intersecting ribs or webs 17, and these form at the central part of the rubber heel, air cells in which the air is trapped when the heel is in use, and being yieldable, form a cushion which yields when the heel engages the pavement or floor and the weight of the wearer is applied to the heel.

This cellular protuberance of intersecting webs not only causes a cushion effect, but it very materially assists in causing the marginal portion of the rubber heel to hug or tightly cling to the corresponding portion of the shoe heel. When the rubber heel is applied to the heel of the shoe, by driving in the attaching devices which are located about the edge or perimeter of the cellular protuberance, the latter is compressed, forming a slight protuberance indicated at 18 in Fig. 5 upon the tread face of the heel, and this compression forces the marginal portion of the heel downward against the shoe heel which is indicated at 19 in Fig. 5. In other words, the different sectors of the heel have an action akin to that of a bell-crank, the compression of the inner or central part, rocking or pivoting the theoretical sectors about the attaching devices 13 as axes so as to force the outer marginal portions firmly in contact with the heel of the shoe. This causes the rubber heel to cling to the heel of the shoe all about the margin of the former, preventing effectively the entrance of dirt and the like between the shoe heel and the attached rubber heel, and as before stated, renders the use of cement unnecessary.

I find that the action of the cellular protuberance in causing the marginal portion of the rubber heel to cling to the heel of the shoe is somewhat enhanced by increasing with a slight or gentle curvature the thickness of the rubber heel at the point or rear end indicated at 20 in Fig. 7, and also at the points or corners of the breast of the heel as indicated at 21 in Fig. 8. I do not regard this feature, however, as essential, and if desired, the marginal portion of the rubber heel may be made of uniform thickness all the way around.

At the rear quarter of the rubber heel I prefer to provide cork plugs 23, which are exposed on the tread face of the heel and engage the surface over which the wearer is walking when the wearer lowers his foot on the surface in the act of taking a forward step, these cork plugs being particularly useful in reducing the danger of slipping on a wet surface. It will be apparent, however, that these cork plugs are not essential to the main features of the invention, and can, if desired, be omitted from the construction.

It was before stated that the cellular protuberance on the attaching face of the rubber heel causes a projection or protuberance 18 on the tread face of the rubber heel when the latter is applied to the heel of the shoe. When the wearer is walking and places his weight on the heel, this outer protuberance 18 flattens out, the webbing on the attaching face of the heel yielding to permit this, and thus the cushion effect previously referred to is obtained. Of course, the cushion effect is enhanced to some extent by the air trapped in the cells, for the escape of the air when the cellular structure is compressed by the weight of the wearer, is somewhat retarded by the close adherence of the rubber heel to the heel of the shoe.

This advantage in the way of a cushion effect, together with the utility of the cellular protuberance in causing the marginal portion of the rubber heel to tightly cling to the shoe heel render the present improvements extremely important and result in the heel having distinct advantages over other rubber heels which are being sold and used at the present time.

The word "heel" is used herein in a broad sense to cover a whole heel, or a heel section such as a half heel.

Having described my invention, I claim:

1. A rubber heel having on its attaching face a marginal portion and inside the latter a concavity, and a cellular protuberance projecting upwardly from the base of the concavity and composed of interconnected walls.

2. A rubber heel having on its attaching face a dished marginal portion and inside the latter a concavity, and a cellular protuberance projecting upwardly from the base of the concavity above the adjacent surrounding marginal portion and composed of interconnected walls.

3. A rubber heel having on its attaching face a marginal portion adapted to be pressed against a shoe heel, and inside the latter having a protuberance formed by intersecting webbing substantially normal to the tread face of the heel.

4. A rubber heel having on its attaching face a marginal surface adapted to be pressed against a shoe heel and inside the latter having a protuberance projecting above the adjacent marginal surface, the protuberance having a convex surface tapering down to and intersecting said marginal surface.

5. A rubber heel having on its attaching face a marginal portion and inside the latter a yieldable cellular protuberance, the protuberance having a convex surface tapering down to the marginal portion, and said heel having openings for attaching devices located so that the latter will extend through the attaching face of the heel adjacent the margin of the protuberance.

6. A rubber heel having on its attaching face a dished marginal portion designed to be pressed against a shoe heel, and having inside the marginal portion a protuberance projecting above the adjacent marginal portion and conforming in outline substantially to the outline of the heel.

7. A rubber heel having on its attaching face a marginal portion designed to be pressed against a shoe heel, and having inside the marginal portion a cellular protuberance projecting above the adjacent marginal portion and conforming in outline substantially to the outline of the heel.

8. A rubber heel provided on its attaching face with a substantially centrally disposed cellular protuberance surrounded by a dished portion forming between the center of the protuberance and the margin of the heel a concavity adapted to be flattened when the heel is applied to a shoe heel.

9. A rubber heel having on its attaching face a marginal portion and inside the latter a protuberance formed by intersecting webbing substantially normal to the tread face of the heel, said protuberance projecting upwardly above the adjacent marginal portion and conforming in outline substantially to the outline of the heel, and said heel having openings for attaching devices located so that the latter will extend through the attaching face adjacent the margin of the protuberance.

In testimony whereof I hereunto affix my signature.

RAYMOND I. HILL.